United States Patent [19]
Diamantides

[11] 3,742,495
[45] June 26, 1973

[54] DRONE GUIDANCE SYSTEM AND METHOD

[75] Inventor: Nicholas D. Diamantides, Cuyahoga Falls, Ohio

[73] Assignee: Goodyear Aerospace Corporation, Akron, Ohio

[22] Filed: Sept. 24, 1971

[21] Appl. No.: 183,394

Related U.S. Application Data

[63] Continuation-in-part of Ser. No. 592,532, Nov. 7, 1966, Pat. No. 3,609,762.

[52] U.S. Cl............................. 343/5 MM, 343/7 ED
[51] Int. Cl.............................................. G06f 15/50
[58] Field of Search ...................... 343/5 MM, 7 ED

[56] References Cited
UNITED STATES PATENTS

| | | | |
|---|---|---|---|
| 3,636,323 | 1/1972 | Salisbury et al. | 343/5 MM |
| 3,472,469 | 10/1969 | Evans et al. | 343/5 MM |
| 3,419,860 | 12/1968 | Helber et al. | 343/5 MM |
| 3,614,035 | 10/1971 | Buynak et al. | 343/5 MM |
| 3,493,920 | 2/1970 | MacMunn | 343/7 ED |
| 3,513,931 | 5/1970 | Warner et al. | 343/7 ED |

*Primary Examiner*—Benjamin A. Borchelt
*Assistant Examiner*—G. E. Montone
*Attorney*—J. G. Pere and L. A. Germain

[57] ABSTRACT

A drone aircraft is guided over a desired flight path wherein line map correlation provides $x$ and $y$ offsets from the desired fixed point. The $x$, $y$ offset signals are used to drive the actuators of the drone's control surfaces and also provide positional information to a monitored display at the control station.

15 Claims, 7 Drawing Figures

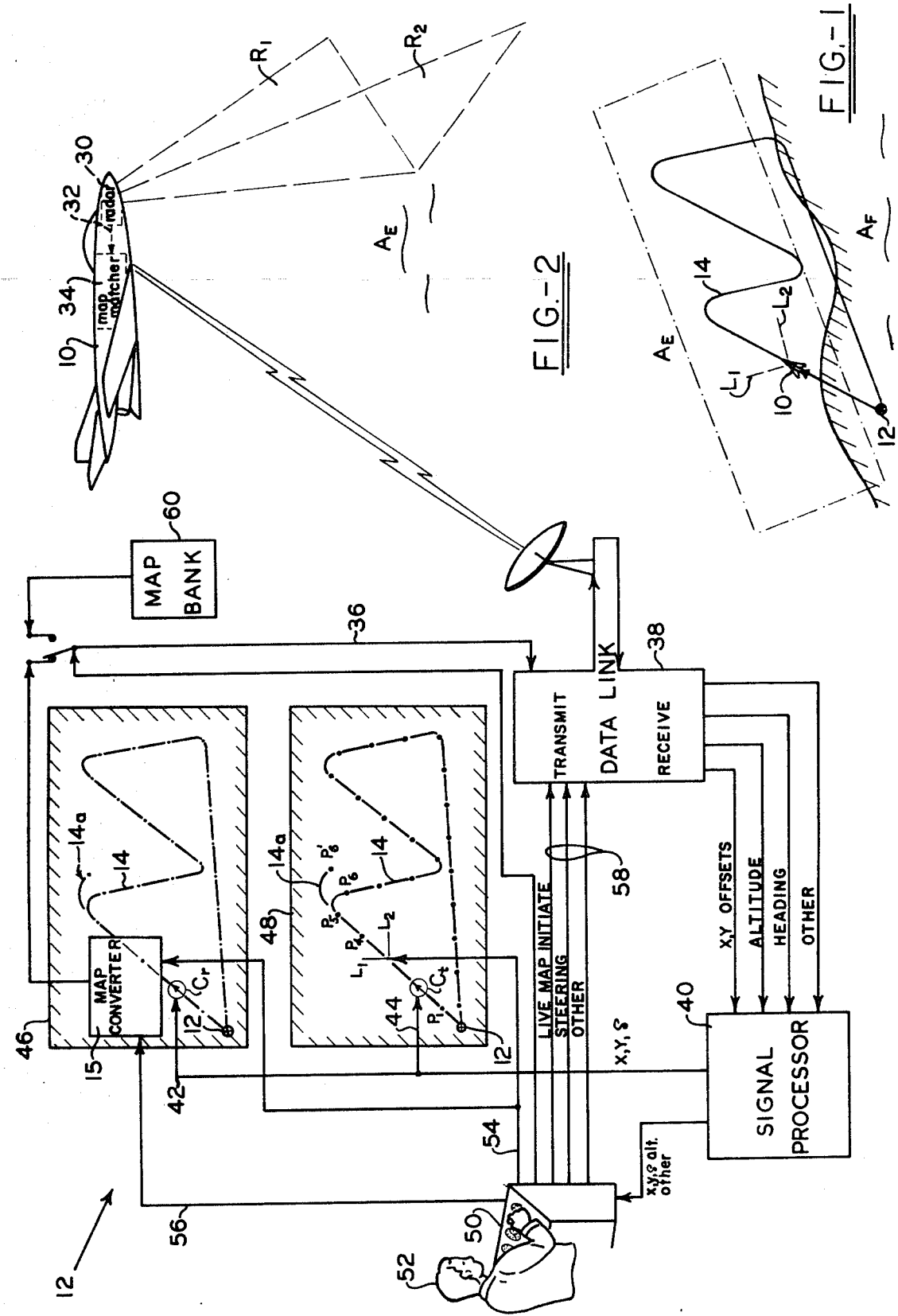

Patented June 26, 1973  3,742,495
2 Sheets-Sheet 2
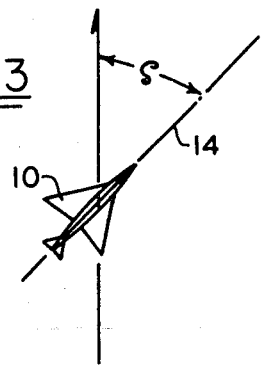
FIG.-3
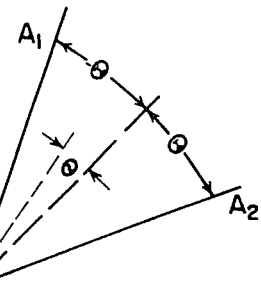
FIG.-4
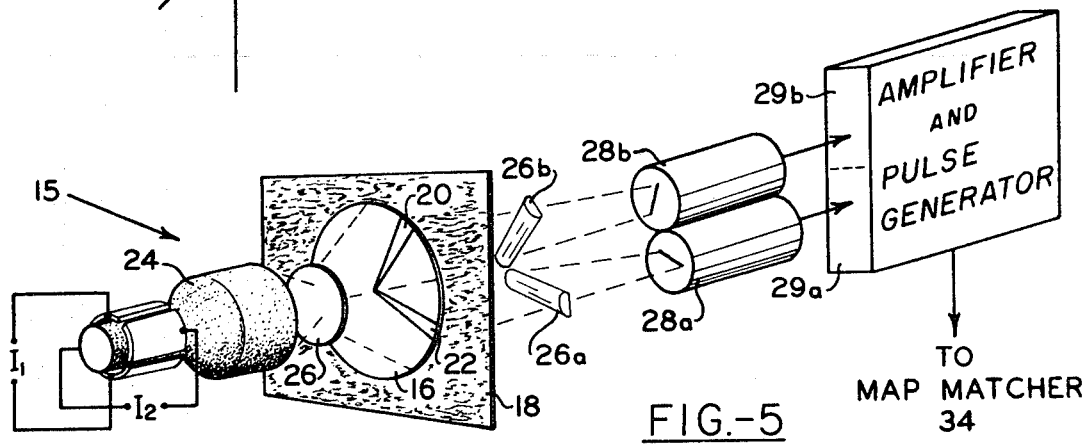
FIG.-5
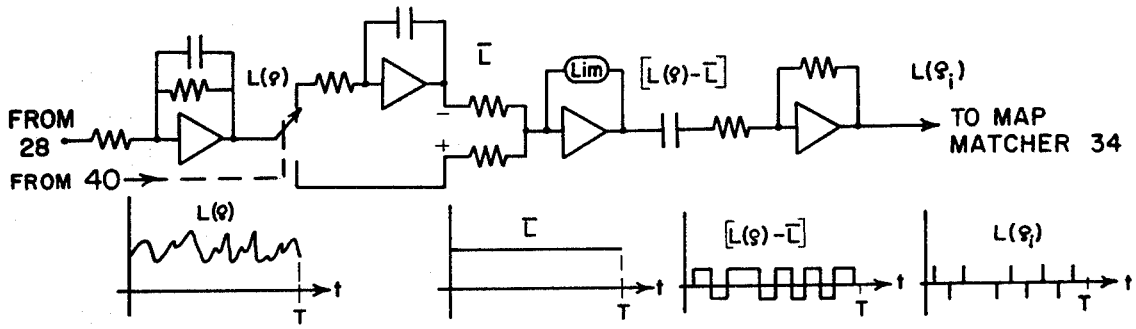
FIG.-6
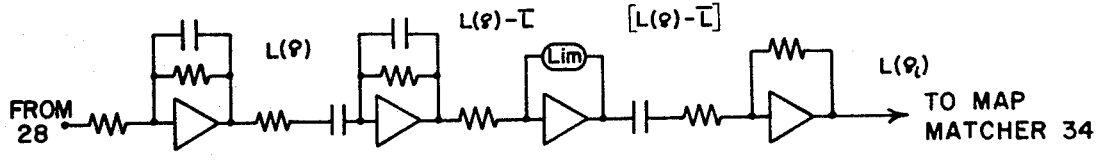
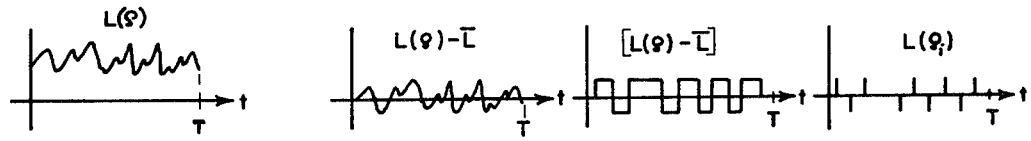
FIG.-6A

DRONE GUIDANCE SYSTEM AND METHOD

CROSS-REFERENCES TO RELATED APPLICATIONS

This application is a continuation-in-part application of co-pending application Ser. No. 592,532, filed Nov. 7, 1966 for DIRECT GRADIENT CORRELATION APPARATUS now issued to U.S. Pat. No. 3,609,762 granted, Sept. 28, 1971.

BACKGROUND OF THE INVENTION

This invention relates to guidance systems and more particularly to automatic guidance and control of pilotless aircraft or "drones". The invention utilizes the teachings of the referenced patent wherein a system for correlating a radar image with a reference image using a technique of line map matching is disclosed. The line map matching technique provides a reading of the offset signal directly from the dynamic match curve and outputs a pulse sequence representing a multilevel slicing of the line video display. The direct gradient map matching technique is applicable to both radar and optical systems.

BRIEF DESCRIPTION OF THE DRAWINGS

FIG. 1 generally illustrates a typical drone guidance pattern;

FIG. 2 is a diagrammatic illustration of the information flow in one embodiment of the invention;

FIG. 3 illustrates the drone heading angle;

FIG. 4 illustrates the drone antenna beam sector;

FIG. 5 shows apparatus for converting the reference map to pulse train signals;

FIG. 6 is a schematic of the pulse generation process; and

FIG. 6a shows an alternate embodiment of the pulse generation process shown in FIG. 6.

DESCRIPTION OF THE PREFERRED EMBODIMENT

Referring to the drawings, FIG. 1 illustrates a typical situation wherein it is desired to guide an unmanned aircraft, or "drone", 10 over an area $A_E$ occupied by enemy forces. The drone 10 originates from a ground-control-station 12 located in area $A_F$, occupied by friendly forces, and is remote-control guided over the desired flightpath 14 to gather intelligence and subsequently return to its control station 12.

The invention assumes that high resolution radar and topographic reference maps are available to an observer in the ground-control-station 12 wherein the observer monitors the drone's flight over the intended path 14. The position of the drone is based upon a pair of line radar maps $L_1-L_2$ derived from the radar reference map according to the direct-gradient-range-only technique described in applicants U.S. patent No. 3,609,762, issued Sept. 28, 1971.

According to the teachings of the reference patent, the derivation of the line map for a given fixed point P and drone antenna direction requires that the antenna beam sector $PA_1 A_2$, illustrated in FIG. 4, is outlined on the radar reference map and properly positioned and oriented. The local map brightness $M(\sigma,\theta)$ is multiplied by the known horizontal beam pattern $b(\theta)$ of the antenna and integration carried out along successive arcs of the sector. The result is the line map $$L(\delta) = \int_{-\Theta}^{\Theta} M(\delta,\theta)\, b(\theta)\, d\theta$$

FIGS. 5, 6, and 6a illustrate methods of implementing this operation, however, other methods will become obvious to persons skilled in the art and therefore it is not applicant's intent to be limited thereto or thereby.

Referring to FIG. 5, a reference map converter is shown generally at 15 wherein an opaque mask 16 is positioned in close parallel plane proximity to the surface of the radar reference map display 18. The mask has two apertures 20 and 22 each covered by a neutral density filter whose transparency varies with azimuth according to the antenna beam pattern $b(\theta)$. The light of a flying spot scanner 24 is focused on the plane of the mask 16 by a focusing lens 26. By feeding currents of the general form $$I_1 = (K_o + kt) \sin\omega t$$
$$I_2 = (K_o + kt) \cos\omega t$$
$$\omega >> k$$

into the deflection coils of the scanner 24, the light spot is forced to describe a tight helix through the neutral density filter and the reference map 18. Thus, under the condition $\omega >> k$, the scan is practically circular with an expanding radius $\sigma = K_o + kt$ where $0 \leq t \leq T$ and traverses the arcs of the apertures 20 and 22. Obviously, $\sigma_N = Ko$ and $\sigma_F = Ko + kT$ are the near and far ranges of the line maps.

The light emerging from each aperture 20 and 22 is focused via lenses 26a and 26b and collected in photomultipliers 28a and 28b where it is converted into a voltage and subsequently sent to amplifier and pulse generator circuits 29a and 29b. The amplifiers, having transfer functions of the form $g(s)=A/1+\tau s$ will cause the output to be proportional to the map $L(\sigma)$ provided the time constant $\tau$ satisfies the condition $1/K >> \tau >> 1/\omega$. According to the requisites of the direct gradient technique described in the referenced patent, one complete scan is used to establish the average level $\bar{L}$ of each line map $L(\sigma) = L(K_o + kt)$, $$\bar{L} = \frac{1}{T}\int_0^T L(K_0 + kt)\, dt$$

The first scan is followed by a second identical scan during which the map L $(\sigma)$ is compared to $\bar{L}$ and the crossings of $\bar{L}$ by L $(\sigma)$ are determined. The crossings are the locations $\sigma_i$ of the pulses of the pulse trains for each line map $L_1$ and $L_2$. FIG. 6 clearly illustrates the basic schematic of the pulse generating process where the waveforms for the appropriate locations are shown and identified.

Alternately, a single-scan mode may be employed, illustrated in FIG. 6A, wherein the signal L($\sigma$) is fed into a high-pass filter that removes the low frequency components including L before it is sent to the pulse generating stages of the circuit. This mode has the advantage of reducing the radiation time in half and hence detection and jamming is more difficult.

Now with reference to FIG. 2 and the implementation of direct-gradient map matching to drone guidance. A drone aircraft 10, flying over enemy territory $A_E$ has an onboard radar 30 that illuminates the terrain below with two substantially orthogonal radar beams $R_1$ and $R_2$. This may be accomplished using separate antennas or electronic beam switching techniques all in a manner known to persons skilled in the art.

The "live" radar imagery is sent via line 32 to a map matcher 34 that also receives pulse train signals 36 via a data link 38, which signals originated at the control station reference map converter 15 as hereberfore described with reference to FIG. 5. For the purpose of this description the map matcher 34 is shown onboard the drone, however, it may as well be located at the control station or else as part of equipment onboard a "mother" aircraft that functions as the control station.

The map matcher 34 correlates the live radar return with the reference map according to the teachings of applicants patent and outputs a signal proportional to the $x$, $y$ offsets of the drone's position from desired fixed points $p_1 \ldots p_i$ along the flight path. This signal is fed to the actuators of the drone's control surfaces and is also transmitted via the data link 38 to the control station 12. In addition, the outputs of the drone's altimeter and heating indicator are sent to the control station via the same data link 38.

The control station 12 provides a signal processor 40 that receives the drone's positional information, ie. $x,y$ offsets, heading, altitude etc. from the data link 38. On the basis of this information, the processor controls the positions of two cursors $C_r$ and $C_t$ via line 42 & 44 respectively, that follow the desired flight path 14 of the drone, which path is marked on a radar reference map 46 and a topographic map 48. The processor also feeds the positional information to an observer's console 50. The radar reference and topographic maps 46 and 48 are displayed in a manner such that an observer 52 may monitor the flight of the drone, and in fact, fly the drone aircraft over any other desired flightpath 14a.

As illustrated in FIG. 2, a number of fixed points $P_1$, $P_2 \ldots P_i$ are shown representative of distances along the path 14 and at which points the map converter 15 produces pulse train signals indicative of the radar line maps $L_1$ and $L_2$, and which signals are sent via the data link 38 to the map matcher 34. As hereberfore mentioned, the observer 52 may desire to change the drone's flight path 14 to a new path 14a based upon other-source intelligence. This may be accomplished by repositioning the cursor $C_t$ via line 54 to a new fixed point $P_8$ which also moves the cursor $C_r$ to a corresponding point on the radar reference map. A new reference map pulse train 36 will be generated and sent to the drone and a new set of offsets determined to bring the drone to its new course.

The observer has various options which he may exercise and which provide a precise control of the drone. First, he may initiate generation of a new pulse train via line 56 at any time during the flight. For example, he may wish to update the map generation at shorter or longer intervals. Secondly, he may change course by repositioning the cursor $C_t$ at a new fixed point $P'$. Third, he may transmit control signals indicated at 58 which may include operation of auxillary equipment onboard the drone. And finally, he may switch to a map bank 60 that contains prestored pulse train signals for the points $P_1-P_i$. These prestored pulse maps were made in the course of prior flights and stored for later use to eliminate the need for generating new maps each time.

Although the invention is illustrated and described with respect to a radar system, it may be implemented with respect to an optical system that provides an output based on line map correlation. Such an optical system is described in applicant's copending application entitled, "DIRECT GRADIENT OPTICAL IMAGE CORRELATION SYSTEM" and identified by Ser. No. 148,359 and filed June 1, 1971.

While in accordance with the Patent statute one best known embodiment of the invention is illustrated and described, it is not intended that the invention be limited thereto or thereby, but that the inventive scope is given in the appended claims.

What is claimed is:

1. A drone guidance system comprising:
   a. means to provide signals indicative of ground scene imagery;
   b. reference scene means;
   c. means operatively connected to the reference scene means to provide voltage pulse train signals indicative of the drone position on the reference scene means;
   d. means operatively connected to and accepting signals from the means providing the ground scene imagery and the means providing the pulse train signals to compare said signals and output error signals indicative of the correlation offset between the two scenes; and
   e. means operatively connected to accept the error signals to provide control signals to the drone.

2. The guidance system of claim 1 wherein the means providing signals indicative of the ground scene imagery comprises a radar providing two orthogonal radar returns along the flight path of the drone.

3. The guidance system of claim 1 wherein the reference scene means comprises a high resolution radar map display.

4. The guidance system of claim 3 wherein the reference scene means further comprises:
   a. a topographic map display; and
   b. means to provide an indication of the flightpath of the drone and its position along said flightpath on the radar and topographic map displays.

5. The guidance system of claim 1 wherein the reference scene means comprises a radar map transparency and the means providing a voltage pulse train comprises:
   a. an opaque mask positioned in parallel plane relationship to the radar map transparency and having two radial and orthogonal apertures therethrough, said apertures covered by a neutral density filter whose transparency varies with azimuth;
   b. first focusing lens means,
   c. a flying spot scanner providing a light source that is focused on the opaque mask by the first focusing means such that the light scan is substantially circular and having an expanding radius and traverses the arcs of the mask apertures;
   d. second focusing means accepting the light scan emitted from the radar map transparency to focus said light into a line map display for each aperture;
   e. photomultiplier means accepting the line map displays to provide an output voltage signal representative of said line maps; and f. circuit means accepting the photomultiplier output signals to provide an output pulse train signal for each line map.

6. The guidance system according to claim 1 wherein optical imaging means provides signals indicative of ground scene imagery and the reference scene means comprises a high resolution photograph.

7. Apparatus to guide the flight of a drone aircraft via a data link from a remote control station and under the continuous control of an operator, said apparatus comprising:
   a. means onboard the drone to provide signals indicative of ground scene imagery along the drone flight path;
   b. reference scene means at the control station to receive position signals from the drone via the data link to provide a visual indication of the drone's position to the operator;
   c. converter means operatively connected to the reference scene means to provide an output voltage pulse train signal indicative of a line video display on the reference scene;
   d. matching means operatively connected to receive the signals indicative of ground scene imagery and the pulse train signal indicative of the line video display to provide correlation of the two scenes and output signals indicative of the x, y offsets from a fixed point along the flight path,
said offset signals transmitted to the reference scene means to move indicators of the drones position on the reference such that the operator may apply steering signals to the drones control surfaces via the data link in response to the offset from a fixed reference along the flight path.

8. Apparatus according to claim 7 wherein the means providing signals indicative of the ground scene imagery is a radar providing returns from two orthogonal radar beams along the flightpath.

9. Apparatus according to claim 7 wherein the reference scene means comprises:
   a. a topographic map display;
   b. a radar map display; and
   c. means providing an indication of the flightpath and position of the drone on the displays.

10. Apparatus according to claim 7 wherein optical imaging means provides signals indicative of ground scene imagery and the reference scene means includes a high resolution photograph of the drone flightpath.

11. Apparatus for guiding a drone aircraft having electronically actuated steering controls from a remote control station via a communications data link, the apparatus comprising:
   a. an onboard radar to provide output signals for orthogonal x and y line map present scene imagery of the terrain over which said drone is flying;
   b. a radar reference map of the terrain over which said drone is flying, having fixed points indicated thereon of the drone flightpath;
   c. converter means to convert the radar reference map at each fixed point into pulse train signals indicative of orthogonal x and y line map video displays wherein the crossing of the two line maps is indicative of the drones position.
   d. matching means accepting the output signals of the onboard radar and the pulse train signals from the converter means to provide output error signals indicative of the x and y offsets from the fixed points on the reference scene;
   e. control means accepting the error signals from the matching means to provide a visual indication of the drones position on the radar reference map and to output steering signals to the drone via the data link.

12. The apparatus of claim 11 wherein the control station means comprises:
   a. a control panel;
   b. signal processor means accepting flight positional information signals from the drone via the data link to provide positional displays to the control panel so that an operator may transmit steering control signals back to the drone in response to the positional information.

13. A method of flying a drone aircraft from a remote control station and under continuous control of an operator comprising the steps of:
   a. providing an onboard radar to obtain signals indicative of the ground scene imagery of two orthogonal radar beams along the drone flightpath;
   b. providing a radar reference transparency at the control station having thereon the desired flightpath and a cursor indicator showing the position of the drone along fixed points on the flightpath;
   c. converting the radar reference transparency into two pulse train signals indicative of two line video displays at the fixed points along the drone's flight path;
   d. matching the onboard radar signals indicative of the ground scene imagery with the radar reference signals indicative of the line video display in a direct-gradient correlator to obtain x and y error signals indicative of the offsets from the fixed points along the flightpath;
   e. applying the error signals to the cursor indicator on the radar reference to provide a visual indication of the drones position along the flightpath; and
   f. transmitting steering signals to the drone controls in accordance with the position offset from the fixed points along the flightpath indicated on the reference transparency.

14. The method of claim 13 further providing a topographical map display in conjunction with the radar reference transparency and having thereon a cursor indicator showing the drones position along the flightpath, said cursor coupled to the cursor indicator on the radar reference transparency and to the operator control station such that a change in either cursor position is transmitted to the other cursor and a new set of pulse train signals are provided to be matched against the position given by the onboard radar.

15. A method of flying a drone aircraft comprising the steps of:
   a. providing an onboard radar to obtain signals indicative of the ground scene imagery of two orthogonal radar beams along the drone flightpath;
   b. providing a map bank of prestored pulse train signals for x and y coordinates at fixed points along the drone flightpath;
   c. combining the signals indicative of the ground scene imagery with the prestored pulse train signals in an electronic direct gradient correlator to obtain x and y error signals indicative of the offset from the fixed points along the flightpath; and
   d. applying the error signals to the drone steering controls.

* * * * *